Nov. 28, 1967  L. M. JOHNSTON, JR., ETAL  3,354,741
SINGLE LEVER CONTROL FOR DUAL RAIL TRANSMISSION

Filed June 14, 1965  6 Sheets-Sheet 2

INVENTORS
LAWRENCE M. JOHNSTON, JR.
RONALD C. SCHROEDER by: Frederick J. Tarbell
ATTY.

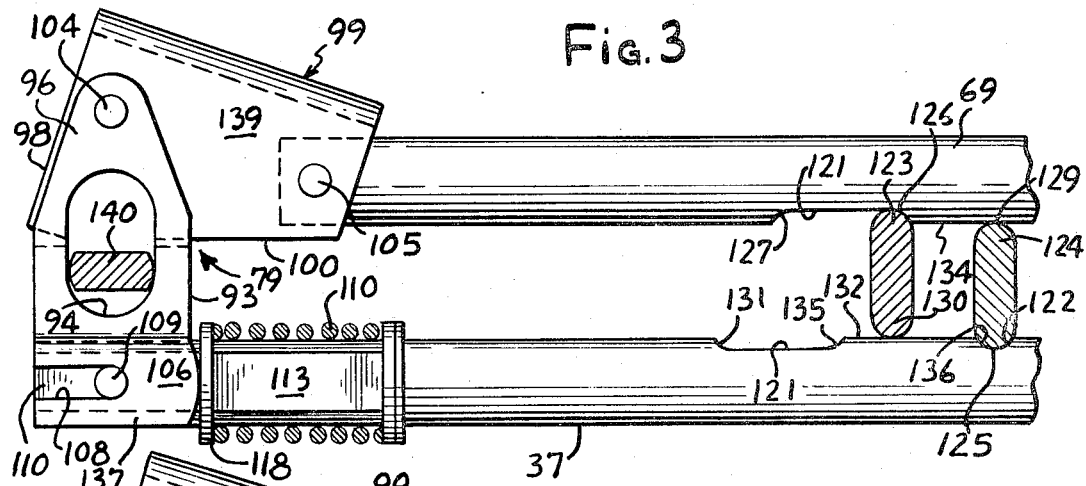
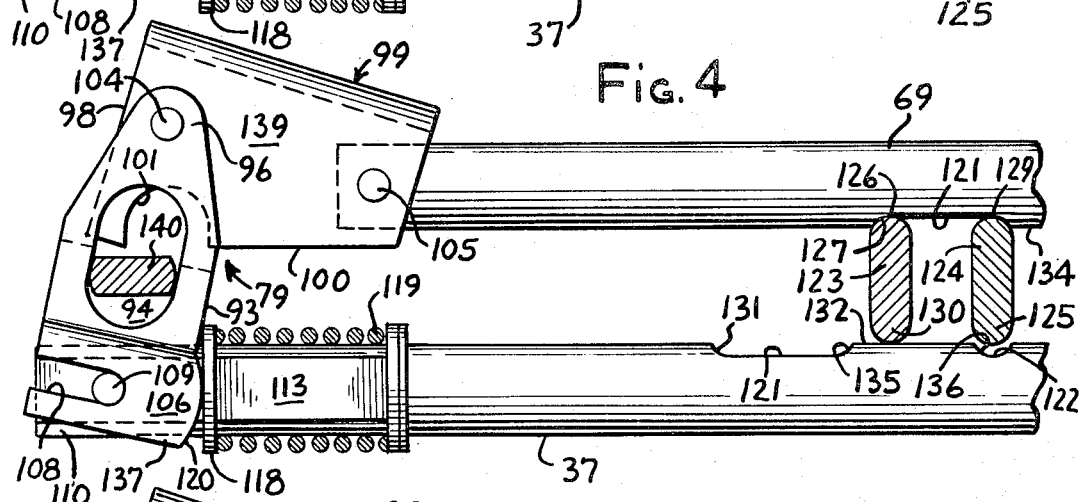
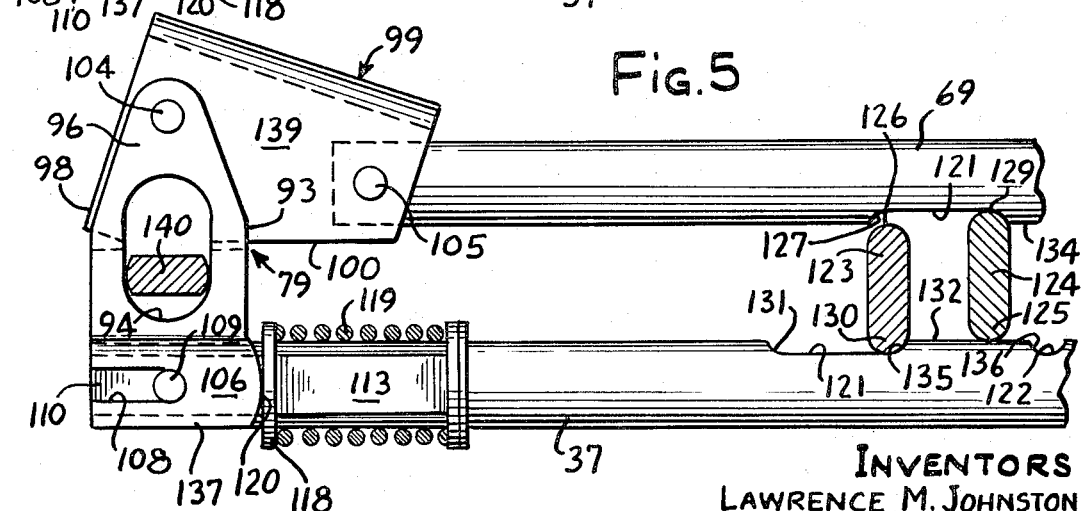

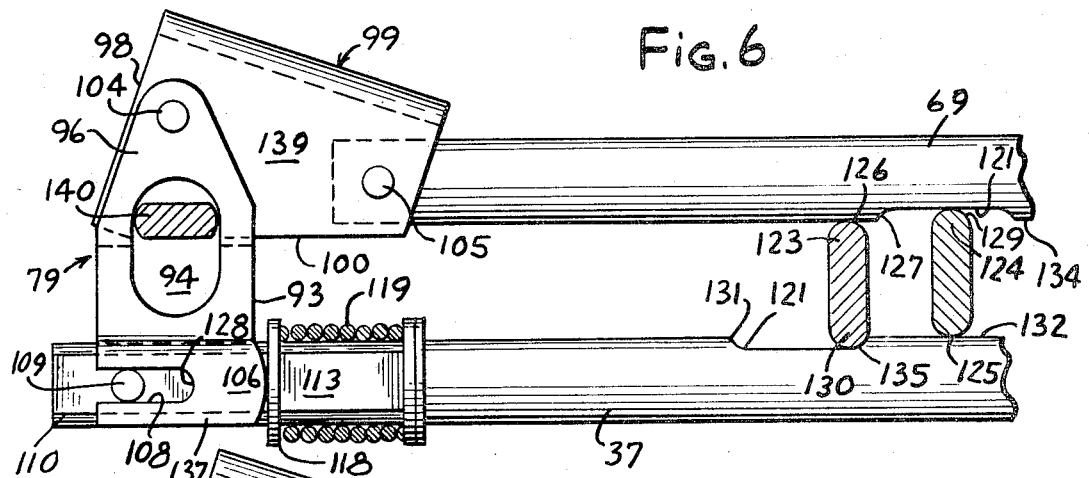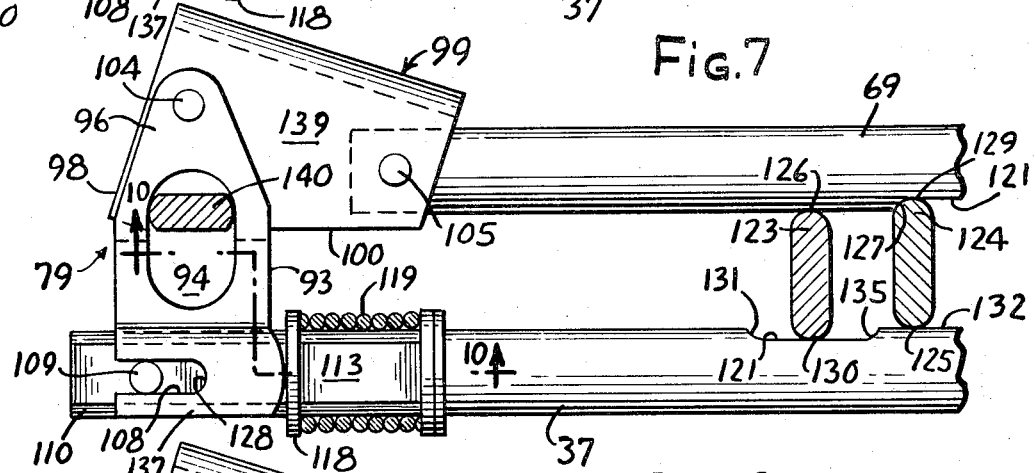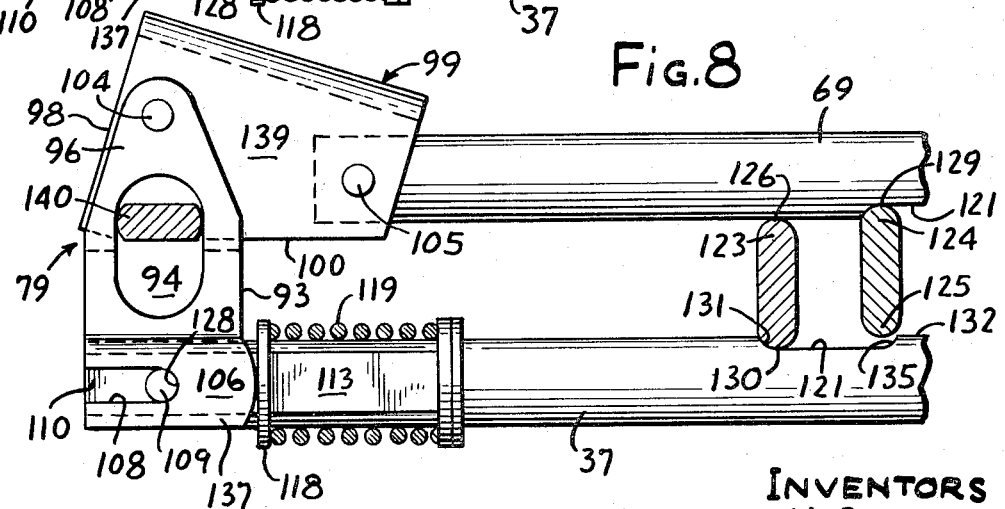

Nov. 28, 1967  L. M. JOHNSTON, JR., ETAL  3,354,741
SINGLE LEVER CONTROL FOR DUAL RAIL TRANSMISSION
Filed June 14, 1965  6 Sheets-Sheet 5

INVENTORS
LAWRENCE M. JOHNSTON, JR
RONALD C. SCHROEDER

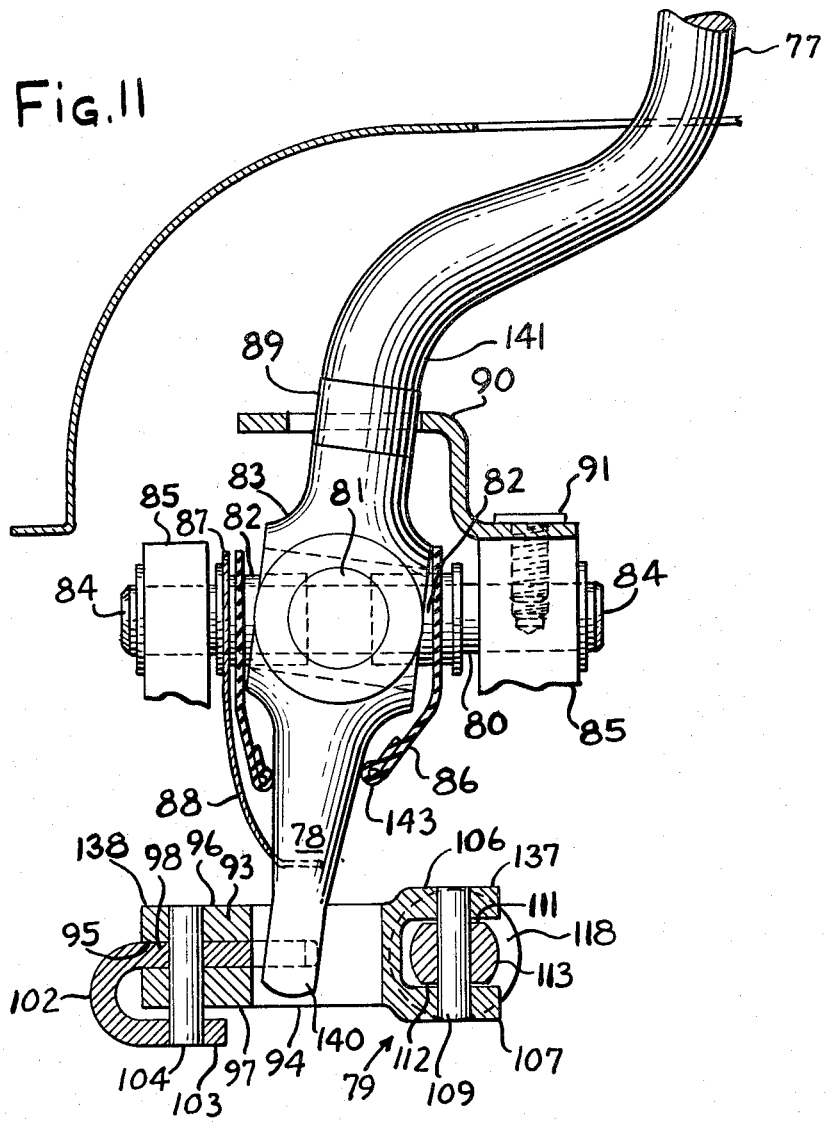

United States Patent Office 3,354,741
Patented Nov. 28, 1967

3,354,741
SINGLE LEVER CONTROL FOR DUAL
RAIL TRANSMISSION
Lawrence M. Johnston, Jr., and Ronald C. Schroeder,
Fort Wayne, Ind., assignors to International Harvester
Company, Chicago, Ill., a corporation of Delaware
Filed June 14, 1965, Ser. No. 463,651
13 Claims. (Cl. 74—477)

ABSTRACT OF THE DISCLOSURE

A single, manually operable transmission control lever for actuating a pair of gear controlling rails of a transmission for a four ground-engaging wheel motor vehicle either simultaneously or singly in a predetermined pattern, one of said rails being selectively actuatable for establishing a low, a high, or a neutral drive ratio condition in two of the four ground-engaging wheels and the other of said rails being selectively actuatable for establishing a low, or a high, or a neutral drive ratio condition in the two other two wheels. An interlock means is also provided for preventing actuation of the rails for establishing a low drive ratio condition in two of the wheels while a neutral or non-drive condition exists in the other two wheels.

---

The instant invention relates to vehicular transmissions. Particularly the invention relates to the means for controlling a transmission operated by a pair of rails and the like. Specifically the invention relates to a single lever control mechanism for operating a pair of gear controlling rails of a dual rail vehicular transmission.

The class of vehicles for which the present invention has been devised is characterized by a change-speed transmission which is adapted to drive either two or four wheels at varying speeds. To that end, a conventional transmission has a pair of shiftable or slidable gears which are adapted to control front and rear vehicular wheels, respectively. That is to say, one of the gears controls the drive to the front wheels while the other controls the drive to the rear wheels. Each of the slidable gears is connected to and operated by a shiftable gear controlling rail which is operably connected to shift lever means operated by the driver of the vehicle embodying the gear mechanism.

To obviate separate manually operated or manual shift levers for each gear controlling rail and thereby minimize crowding in an operator's area, and the complications incident to a separate shift lever for each of the rails, a single manual shift lever control for the dual gear controlling rails is taught in the prior art. However, while minimizing the number of manual shift levers required to operate the dual gear controlling rails, the prior art mechanisms create other problems inherent in their construction.

The dual gear controlling rail construction for each gear mechanism comprises a pair of parallel rails which at one end portion are operably connected to the shiftable gears. At the other end portion, said rails are connected to one end portion of a link which is disposed transversely of said rails. The link has an opposite end portion extending away from the rails and which is operably connected to the single manually operated shift lever control for the rails. Such combination and arrangement of parts results in application of manual shifting force distal and normal to the rails. Such application is mechanically inefficient and results in shifting difficulties.

Furthermore, according to prior teachings, the manual shift lever control is rockable in but a single plane. Accordingly, each of the drive positions of the gear transmission mechanism, as well as the neutral or non-drive position, will have a corresponding manual shift lever control location in such single plane. Such arrangements tend to confuse an operator who, with a transmission having a conventional gear arrangement, would be confronted with five possible positionings of the manual shift lever control in a single plane, namely, two wheel low, two wheel high, neutral, four wheel low and four wheel high.

The prior dual gear control rails of each gear mechanism can be operated only separately, by reason of which, in order to position or engage the gear mechanism in four wheel low drive, it is necessary first to position the gears in a two wheel low engagement. Inasmuch as the rear wheels are the first pair of driven wheels, such two wheels low drive position will cause application of torque to the rear wheels. However, the two wheel low gear position imposes excessive and undesirable torque on the rear axle which prior constructions do not obviate. Instead, such prior devices actuate a signal light as an indicator to the operator of a vehicle that the gears are in four wheel low position. In shifting toward the four wheel low position accompanying instructions inform the operator to shift gears until the signal is seen. To obtain the four wheel low drive condition, the operator must first manipulate the shift lever to its position corresponding to the two wheel low drive condition of the transmission as an intermediate step. Consequently, the operator has at that time either released the clutch or placed the main transmission in neutral to thus release the torque. A hazard exists if the operator does not complete the shift into four wheel low drive position and failure to complete the shift can result from careless operation of the vehicle (not paying attention to the warning lights) or from a warning light failure which the operator knows of. If the indicator light has failed and the operator is aware of the failure, obviously he would not expect to see the light come in four wheel low drive. Therefore, it is possible that the vehicle could be placed in two wheel low drive condition when the operator in fact thought he had shifted to a position corresponding to four wheel low drive. The operator's manuals of prior vehicles utilizing transmissions of the type to which the present invention relates do not define the two wheel low drive position but only instruct to shift until the indicator light shows four wheel low. From the foregoing, it will be appreciated that of the two wheel low position is applied for such period as the gears remain in that position until the operator does in fact remove them by shifting of the shift lever control means. For the period that the gears remain meshed in the two wheel low position, however, a hazard from the excessive torque is continually present.

It is an object of the instant invention to provide a single manual shift lever control mechanism, for a change-speed transmission having a pair of adjacent parallel gear control rails adapted to connect the gears of the transmission into two wheel and four wheel drive in which the torque of the manual shift lever is applied between and adjacent the ends of the gear control rails.

It is another object of the instant invention to provide a change-speed transmission of the described class having means by which the single lever control mechanism can operate the dual gear control rails singly or together.

It is a further object of the instant invention to provide means in a transmission construction of the described class for rocking the single manual shift lever in several planes in each of which several positions are defined corresponding to the respective gear positions.

It is a still further object of the instant invention, in a device of the described class, to provide means for precluding meshing of gears in a two wheel low position. Yet a further object of the instant invention is the provision of a device of the described class of a force transmission link means adapted to transfer the shifting torque of the manual shift lever to the dual gear control rails, said link means characterized by a locking mechanism for releasably connecting the rails together, whereby they may be moved singly or together.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

In the drawings:

FIG. 3 is a partial view longitudinally of the vehicle taken on the line 3—3 of FIG. 1 and looking in the direction of the arrows, illustrating one position of the gear control rails, portions being broken away for the purpose of illustration.

FIG. 4 is a view similar to FIG. 3, however showing another position of the gear control rails.

FIG. 5 is a view similar to FIG. 3, showing still another position of the gear control rails.

FIG. 6 is a view similar to FIG. 3, showing yet another position of the gear control rails.

FIG. 7 is a view similar to FIG. 3, showing a different position of the gear control rails.

FIG. 8 is a view similar to FIG. 3, showing still a different position of the gear control rails.

FIG. 11 is a transverse sectional view in a substantially vertical plane taken along the line 11—11 of FIG. 10 and looking in the direction of the arrows.

Figure 1:
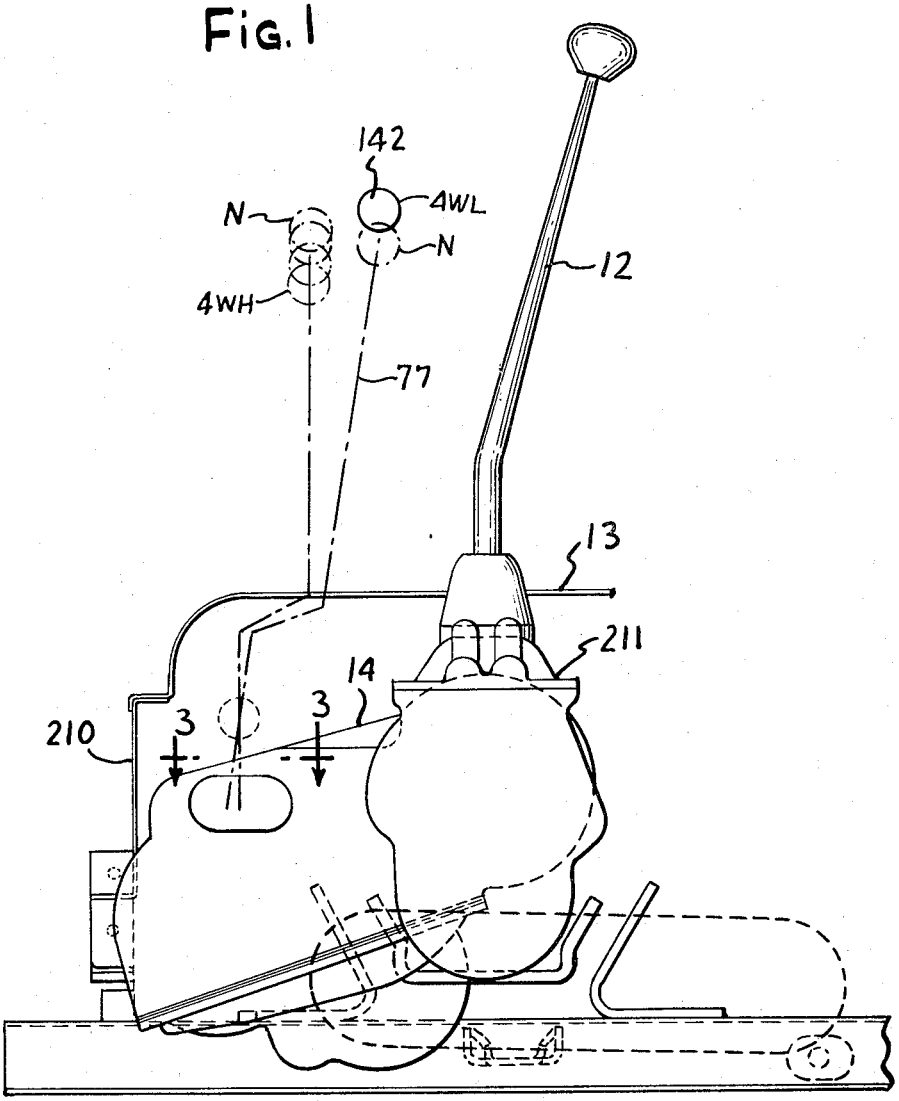
FIG. 1 is a partial transverse sectional view in a vertical plane of a vehicle embodying the form of the instant invention and looking toward the rear of the vehicle from in front of the operator's position.

Referring now more particularly to FIG. 1, the instant invention is shown in assembly relation with a four wheel vehicle 210, only a portion of which is illustrated. The vehicle 210 is provided with a transmission housing 211 for the customary gear mechanism (not shown), having a customary manually operable shift lever 12 which is projected upwardly from the floor 13 of the vehicle and below which the transmission housing 211 is mounted. Disposed to one side of the transmission housing 211 and secured thereto in a manner known in the art is a casing 14, generally referred to as a transfer case, for an auxiliary transmission gearing mechanism generally designated by numeral 15 and illustrated in FIG. 2.

Figure 2:
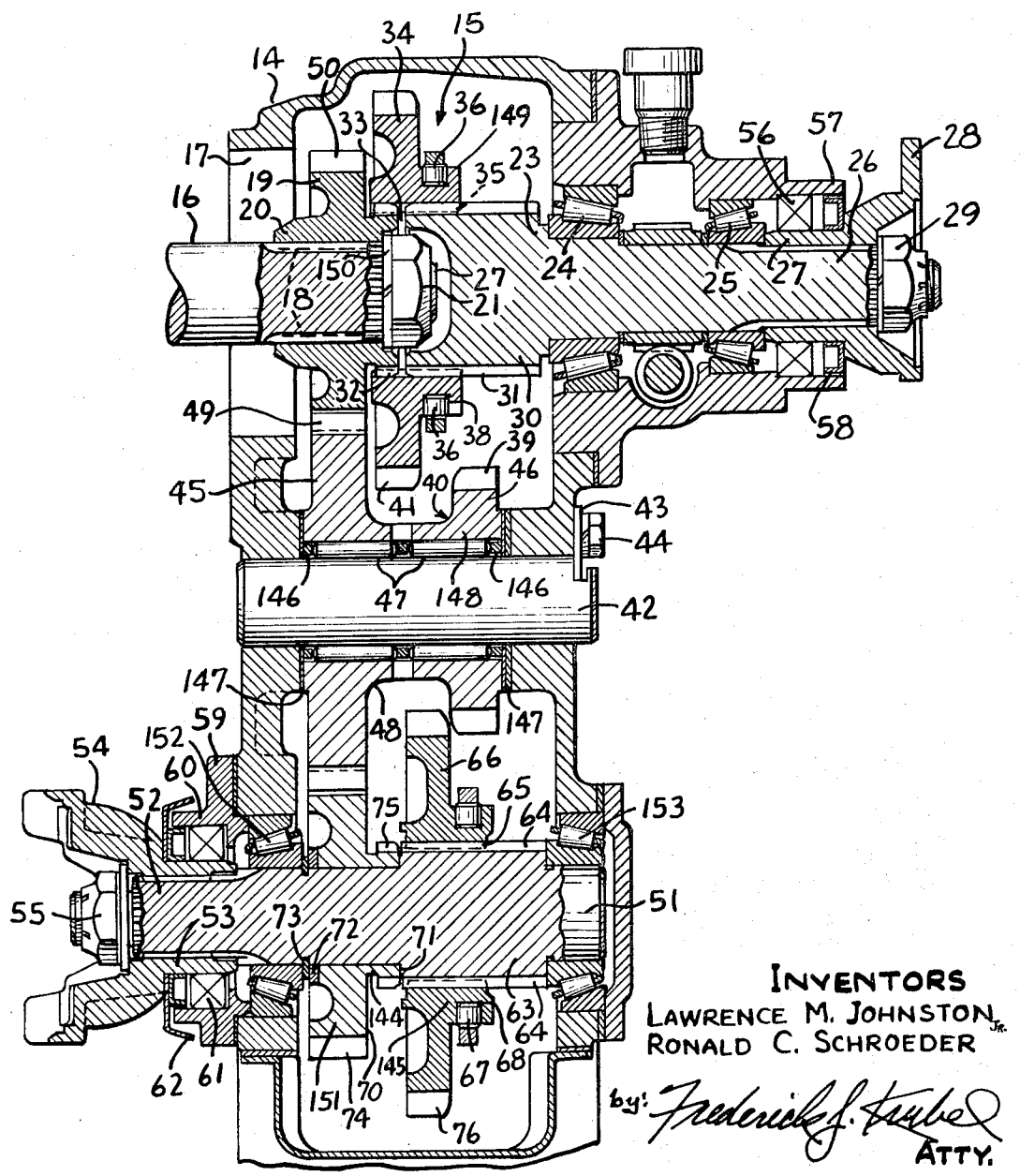
FIG. 2 is a cross sectional view through the transfer case and illustrating the gear mechanism.

The gearing mechanism 15 is powered by an input shaft 16 which is shown in dotted lines in FIG. 2 and which is operably connected to the main or regular power transmission mechanism which, in turn, is operably connected to the prime mover means (not shown) for the vehicle 210. The input shaft 16 extends into the casing 14 through a therein provided aperture 17, and on the inner end portion of said shaft 16 there is mounted a double gear 19 by means of splines 18. The gear 19 is retained from movement longitudinally of the shaft 16 in one direction by the abutments between the shaft 16 at the end of splines 18 and the hub 20 of the gear 19. Gear 19 is retained from longitudinal movement axially of the shaft 16 in an opposite direction by means of a washer 150 which is retained on the reduced threaded end portion 22 of the input shaft 16 against hub 20 by a nut 21.

The input shaft 16 is co-axially aligned with a drivable rear output shaft 23, which comprises a drive link in the power train to the rear wheels of the vehicle 210. The output shaft 23 is journalled in the casing 14 in opposed bearings 24 and 25 and has a reduced splined outer end portion 26 on which the hub 27 of a conventional universal joint flange or coupling 28 is engaged and held against axial movement by means of a nut 29 threaded on the outer end of the shaft 23. The universal joint flange 28 provides the means for coupling the shaft 23 to a rear drive shaft (not shown) which transmits the output power of shaft 23 to the rear axle of the vehicle 210.

As illustrated in FIG. 2, hub 27 is disposed within annular extension 57 of casing 14. The inner end of hub 27 abuts bearing 25, and a seal 56 suitably mounted between the extension 57 of said housing and the hub 27 provides a journal for said universal joint flange 28. A conventional oil slinger 58 closes the opening into the extension 57 through which hub 27 extends.

An enlarged inner end section 30 of the shaft 23 is circumferentially splined to provide a plurality of teeth 31 which are axially alignable with and the same size and pitch as the smaller radius teeth 32 of the gear 19 from which the inner end portion 30 is slightly spaced by means of a spacer 33 retained about the end portion 22 by means of the nut 21, as illustrated in FIG. 2. A shiftable gear 34 is mounted on the enlarged shaft portion 30 with its internal teeth 35 meshed with the teeth 31. The gear 34 is slidable by shifting, in a manner which will presently become apparent, axially of the shaft 23 along the teeth 31 into and out of mesh with teeth 32. A fork or yoke 36 which is operably connected to gear control rail 37, clearly illustrated in FIGS. 3–8, inclusively, is mounted in annular recess or groove 38 of hub 149 of gear 34, whereby said gear 34 may be shifted axially of the output shaft 23 upon operation of the rail 37, in a manner which will become hereinafter apparent.

When the gear 34 is in the position illustrated in FIG. 2 with the teeth 35 in mesh with the teeth 32, the output shaft 23 will be operated at high speed or what is referred to as rear wheel high. By shifting the gear 34 to the right with respect to FIG. 2 to disengage the teeth 32 and 35 but not sufficiently far to cause engagement of the teeth 39 of a double gear 40 with the external teeth 41 of the gear 34, the gear 34 is in a neutral position with the output shaft 23 in non-drive condition.

The double gear 40 is journalled on a fixed countershaft 42 by means of bearings 47 disposed within the hub 148 of said gear 40 and retained by opposed washers 147 held by casing 14 against the outer races 146 for said bearings 47. The countershaft 42 extends transversely of the casing 14 in which it is secured parallel to shaft 23 by means of a retainer 43. Retainer 43 may be secured to casing 14 in any suitable manner, such as by fastener 44, to restrain the shaft 42 from movement, as illustrated in FIG. 2.

The double gear 40 has a pair of axially spaced gear flanges 45 and 46 of different radii and defining therebetween a wide annular groove or recess 48. The gear flange 45, being a larger radius, comprises the high speed portion of the double gear 40 and carries thereon teeth 49 which are continuously in mesh with the teeth 50 of the gear 19. The flange 46 is the smaller radius or low speed portion of the double gear 40, and carries thereon the teeth 39 heretofore defined.

From the foregoing, it is seen that the gear 40 which is retained from axial movement by the casing 14, as illustrated in FIG. 2, will be driven when the shaft 16 rotates, regardless of the position of the slidable gear 34. Should the gear 34 be moved sufficiently to the right with respect to FIG. 2 from the neutral position heretofore described to the position where the teeth 39 and 41 mesh, the torque of the input shaft 16 will be transmitted to the shaft 23 through low speed gear flange 46. It is this rear wheel low position that is the object of this invention to bypass if the four wheel drive is not engaged in a manher by reason of structure which will become presently apparent.

A third or front output shaft 51 parallel to the shafts 23 and 42 is journalled in bearings 152 and 153 suitably mounted in the casing 14, as illustrated in FIG. 2. The output shaft 51 has a reduced splined extension 52 projecting externally of the housing 14 and upon which the hub 53 of a universal joint flange or coupling 54 is engaged and held against axial movement by means of a nut 55 threaded on the end of said output shaft. The universal joint flange 54 provides the means by which the output shaft 51 is connected to a front wheel drive shaft (not shown) to transmit the torque of the shaft 16 to the front axle of the vehicle 210.

A bearing flange or housing 59 is mounted about the opening in the casing 14 through which the shaft end portion 52 is projected. The hub 53 is disposed within an outwardly extending annular lip 60 of said bearing flange or housing 59, and a seal 61 is suitably mounted between the hub 53 and the lip 60 to facilitate rotation of the universal joint flange 54. An oil slinger 62 closes the opening formed by the lip 60 about the universal joint flange 54, as illustrated in FIG. 2.

The output shaft 51 has an enlarged splined section 63 which is provided with circumferentially spaced teeth 64 engaged by interior teeth 65 of a shiftable gear 66. Gear 66 is shiftable axially of the output shaft 51 by means of a fork or yoke 67 seated in a recess 68 in the hub 145 of gear 66. The yoke 67 is operably connected to a gear control rail 69 which is clearly seen in FIGS. 3–8, inclusively.

A double gear 70 which is journalled on the output shaft 51 is retained from axial movement to the right with respect to FIG. 2 by engagement on one side with an annular shoulder 71 formed by the shaft enlarged or splined section 63. In a recess on the opposite side of the gear 70, there is disposed a bushing 72 which is engaged with a ring or washer 73 abutting the inner race of the bearing 52 to retain the gear 70 from axial movement to the left with respect to FIG. 2. The double gear 70 has a large radius gear flange 151 carrying external teeth 74 which are in continuous mesh with the teeth 49 of the gear flange 45, whereby the gear 70 will be driven whenever the input shaft 16 rotates.

Gear 70 is the high drive gear for the front axle of the vehicle 210 to which gear 70 becomes operably connected upon meshing of the teeth 65 with external teeth 75 carried on small radius gear flange 144 of the gear 70. The same occurs when the gear 66 is moved to the left with respect to FIG. 2 to couple the teeth 64 with the teeth 75, teeth 64 and 75 being of substantially the same radius and pitch and registerable and alignable with each other in a conventional fashion, as illustrated.

When the gear 66 is shifted to engage the gear 70, the input torque will be transmitted through the output shaft 51 to the front axle of the vehicle 210. When the gear 66 is disposed in the position illustrated in FIG. 2, that is, in a non-meshing condition with either the gear 49 or the gear 70, the gear 66 is in the neutral position. Shifting the gear 66 to the right from the position illustrated in FIG. 2 to enmesh its teeth 76 with the teeth 39 of the gear 40 drives the shaft 51 at low speed and accordingly the latter position is designated as front wheel low.

In accordance with the instant invention, the front wheel low position of the gear 66 can be achieved only when the rear wheel low position is assumed by the gear 34, and, as previously indicated, the converse is the fact whereby the low drive of the transmission can be achieved only when both gears 34 and 66 are in low drive position, whereby the only low drive condition of the herein described transmission is four wheel low.

To operate the shift rails 37 and 69, a single lever control means comprising manual shift lever 77 is employed. As illustrated in FIG. 1, the shift lever 77 may be mounted adjacent the customary main lever 12 extending downwardly through the floor 13 and beneath which its lower end extension 78 which terminates in a work head 140 is in operative relationship with a force transmission link means or assembly generally designated as 79, the specific details of construction of which will be presently described.

The fulcrum for the shift lever 77 is spaced slightly upwardly from the working extension 78, and comprises a pair of pins 80 and 81 which are crossed normally to each other within the joint housing 83 provided in a medial portion of the shift lever 77. Thereby said shift lever is rockable in a pair of planes perpendicular to each other. In the embodiment shown, the pin 80 extends transversely to the longitudinal axis of the vehicle 210 with its opposite end portions 84 operably supported in a pair of opposed transversely spaced apart frame extensions 85, whereby said pin 80 provides a fixed axis of rotation for rocking the shift lever 77 clockwise and counter-clockwise with respect to FIG. 10. The pin 81 is of larger diameter than is the pin 80, and has a transverse bore centered therein through which the pin 80 extends. By reason of the foregoing construction, as the shift lever 77 is rocked, or rocks about the pin 80, the pin 81 which provides a rockable axis also rocks correspondingly.

As illustrated in FIG. 11, the opposed bearing sleeves 82 for pin 80 may support a depending boot 86 in which the joint housing 83 is disposed. The lower rim 143 of said boot snugly engages lever 77 and defines an aperture from which the work extension 78 is projected downwardly. As illustrated in FIG. 11 one of the sleeves 82 also provides the means for anchoring the upper end portion of spring 87, the lower end portion 88 of which biases the shift lever 77 in the manner illustrated in FIG. 11.

Figure 9:
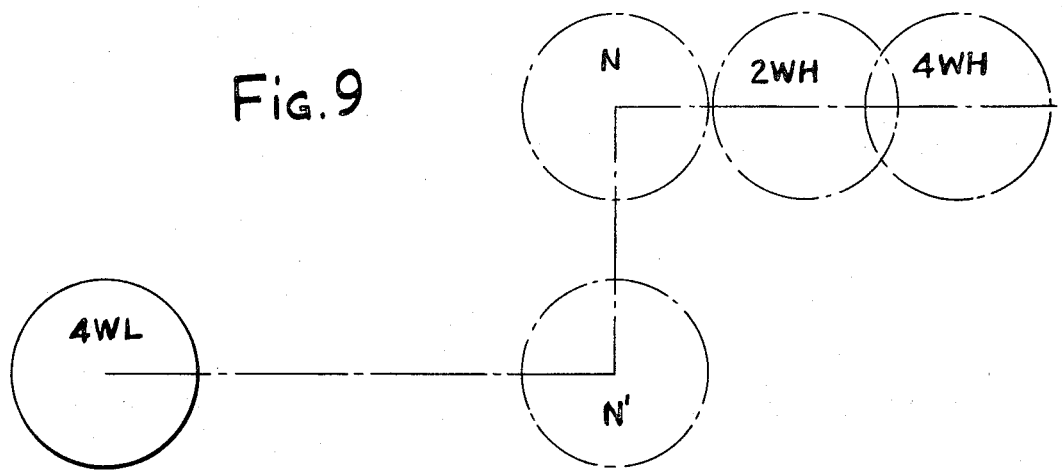
FIG. 9 is a diagram of the shift pattern viewed from above the manual shift lever.
Figure 10:
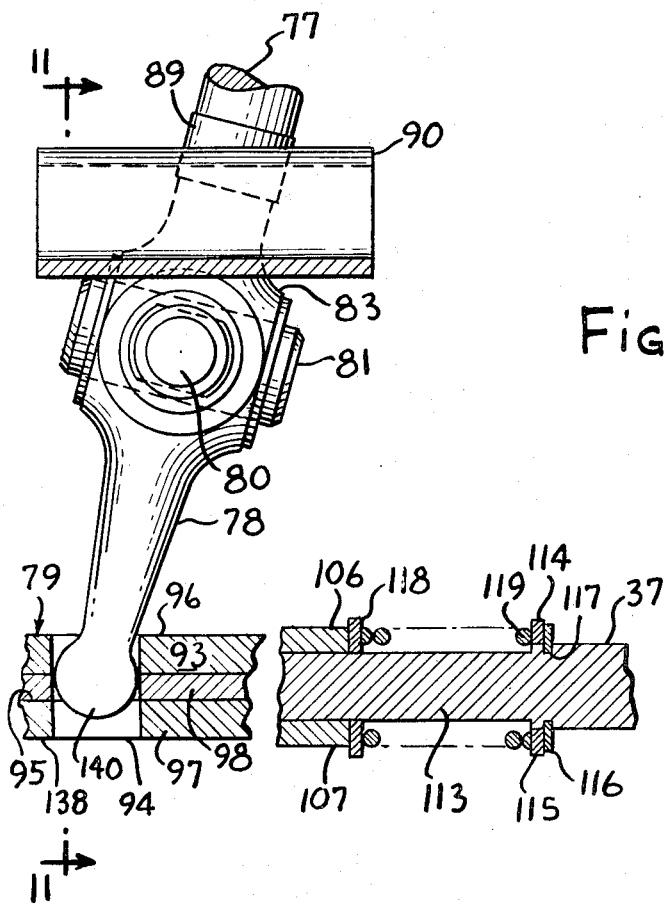
FIG. 10 is a vertical sectional view taken substantially on the line 10—10 of FIG. 7 and looking in the direction of the arrows.

The foregoing construction permits a somewhat limited side-to-side movement of the shift lever 77 by reason of the fixed pin 80, whereas the front-to-back rocking, that is, clockwise and counterclockwise with respect to FIG. 10, is not thus limited. Accordingly, a shift pattern for the illustrated embodiment and as shown in FIG. 9 is available. In such pattern, movement of shift lever handle 142 leftward of FIG. 9 would be away from an operator of the vehicle 210, whereas movement rightward of FIG. 9 would be toward an operator sitting in a customary or normal driving position. In the shift pattern, the various positions available for the handle 142 have been identified by symbols identifying corresponding gear positions and having the following means: 4WH for four wheel high, 2WH for two wheel high, N for neutral and 4WL for four wheel low.

To facilitate operation of the lever 77 within the shift pattern, a medial portion 141 of the shift lever 77 spaced upwardly from the joint housing 83 has a bearing collar 89 which is disposed in a gate plate 90 apertured to conform with the shift pattern. The gate plate may be secured in a position by means of a fastener 91 such as a screw or the like which secures a rigid flange 92 of said gate plate 90 to one of the frame members 85, as illustrated in FIG. 11.

As illustrated in FIGS. 3–8, inclusive, 9 and 11, the force transmission link means or assembly 79 comprises what may be referred to as a first or primary flat link 93 disposed in a substantially horizontal plane and having a relatively large medial elliptically shaped aperture 94 in a horizontal plane which extends substantially vertically through said primary link. The lowermost end 140 of the work extension 78 comprises a somewhat enlarged head which is disposed in said aperture 94 and is shiftable therewithin from right to left with respect to FIG. 11 and upwardly and downwardly with respect to FIGS. 3–8, inclusive. At opposite curved portions of aperture 94, head 140 will be frictionally gripped by the curved walls of said aperture.

The outside portion 138 of the link 93 is slotted, as at 94, to provide a pair of upper and lower facing plates 96 and 97 between which a forward end portion 98 of the upper plate 139 of what is referred to as a secondary link 99 is mounted. As illustrated in the drawings, the upper plate 139 of the secondary link 99 may be substantially trapezoidal in design and have a recess 101 extending from its inner edge 100, as illustrated in FIG. 4. The secondary link 99 has a side bend 102, as illustrated in FIG. 11, extending longitudinally of the secondary linkplate 139 and integral with which there is a lower link extension 103 parallel to the secondary link plate 139 and disposed beneath a lateral part of the plate 97. A pivot pin 104 which extends through the plates 96 and 97 and through the secondary link plate 139 and extension 103 provides a means for rocking the primary link 93 clockwise and counterclockwise relative to the secondary link 99, as viewed in FIGS. 3–8, inclusive, about the pin 104. A fastener which may include a pin 105 rigidly secures the rear end portion of the secondary link 99 to the forward end portion of the rail 69 from which the secondary link 99 extends forwardly substantially coaxially with said rail 69, as illustrated in various of the drawings.

As illustrated in FIG. 11, the inside portion 137 of the primary link 93 comprises a pair of upper and lower substantially parallel vertically spaced apart flats 106 and 107 which have corresponding forwardly opening recesses or slots 108 through which there is projected a vertical pin 109 which is rigidly secured to and carried by the outermost end portion 110 of a reduced end extension 113 of the rail 37.

Not only is the diameter of the end extension 113 reduced, but also the reduced end extension 113 has a flattened top 111 and bottom 112, as illustrated in FIG. 11, to facilitate movement axially of rail 37 between the plates 106 and 107, for a reason which will presently become apparent. As illustrated in FIG. 10, the reduced end extension 113 may be defined by a shoulder 114 on which there is rigidly secured a peripheral bearing rim 115 which is supported against a rearwardly directed force by abutment with a retaining ring 116 which is mounted in a groove 117 in the rail 37. An annulus or washer 118 which is disposed about the reduced end extension 113 is spaced forwardly from the shoulder 114 by means of a compression spring 119 disposed about extension 113 and the opposite ends of which bear against the rim 114 and the annulus 118, as illustrated in FIG. 10, to urge the annulus 118 into contact with the rearwardly curved rear end bulged surface portions 120 of the inside portion 137 of primary link 93. The washer 118 is disposed loosely about the reduced end section 113, whereby the rail 37 is movable to the right and left with respect to FIGS. 3–8 and 10, relative to the primary link 93, the path of relative movement of the rail 37 with respect to said primary link being defined or guided by the pin 109 within the recesses or slots 108, as illustrated in the drawings. From the foregoing, it will be appreciated that the force tending to move rail 37 rearwardly or to the right, as viewed in FIGURES 3–8, imposed thereon by the head 140 is transmitted thereto through the intermediary of the curved surface portions 120, washer 118, spring 119 and rim 114.

Each of the gear control rails 37 and 69 has an elongated inwardly opening shallow recess 121 extending longitudinally of its respective rail, the entire recess 121 in the rail 69 being disposed rearwardly of the recess when the rails 37 and 69 are in the position illustrated in FIGURE 7. However, at certain dispositions of the rails, a forward portion of recess 121 in rail 69 is in lateral alignment a rearward portion of recess 121 in rail 37, as illustrated in FIGS. 3–8, inclusive. It is to be understood that the recesses 121 are substantially semi-circular in shape in vertical transverse section. Additionally, the rail 37 has a semi-spherically shaped recess 122, the defining wall 136 of which is spaced rearwardly of the rearward wall 135 of recess 121 in the rail 37 a distance approximately equal to the length of the recess 121 in said last mentioned rail, the length of each recess 121 being about three and one-half times the length of recess 122. The front-to-rear length of the recess 122 is about the same as the corresponding dimension of each of interlock pins 123 and 124 to the next described. It is also to be understood that the depths of the recesses 121 and recess 122 measured in a lateral direction are the same.

A pair of interlock pins or keys, the forward of which is identified by the numeral 123 and the rearward of which is identified by the numeral 124, are disposed in spaced apart front-to-rear relationship relative to the vehicle 210, and are slidably mounted transversely of the gear control rails 37 and 69. Each of the interlock pins 123 and 124 is mounted in a manner to restrain movement thereof rotationally and longitudinally of rails 37 and 69. Furthermore, each of the interlock pins is substantially the same length as the other which length is equal to the lateral distance between the inner facing surface portion 134 of rail 69 and the inner facing surface portion 132 of rail 37 plus the depth of a recess 121 or recess 122. Thus, when one end of one of the pins 123, 124 is fully disposed in a particular recess 121 or 122 of one of the rails 37, 69, no part of the opposite end portion of the pin can possibly project into the recess or recesses of the other unit 37, 69. Furthermore, it will be noted that the opposite end portions of the pins 123, 124 are semi-spherical in shape.

A clearer appreciation of the manner of the operation of the device will be had by referring to FIGS. 3–8, inclusive, in connection with which it is suggested that FIG. 3 represents the four wheel high position of the shift rails 37 and 69. In such position, the handle 142 of the shift lever 77 is in the position designated 4WH in FIG. 9, whereas the work head 140 is diagonally opposite thereto, disposed in that lateral end portion of the elliptical opening 94 which is adjacent to the portion 137 of primary link 93. In such position, the rail 37 is locked from relative movement longitudinally thereof with respect to the rail 69 and the relatively fixed transfer casing 14 by interlock pin 124. Inasmuch as the end 129 of interlock pin 124 in engagement with the inner facing surface portion 134 of rail 69 the pin 129 is blocked and cannot move laterally upon the application of a longitudinal or axial force to the rail 37. On the other hand, rail 69 is free to move rearwardly with respect to rail 37 and the transfer casing 14 inasmuch as one end of interlock pin 123 is deposed within the recess 121 associated with rail 69 and bears against the inner surface 132 of rail 37 and therefore the opposite end thereof bears against inner surface 132 and thus disengaged from the bottom of recess 121 in rail 69. With the rails 37 and 69 positioned as illustrated in FIGURE 3 the gear 34 is in mesh with the gear 19 and the gear 66 is in mesh with the gear 70. Consequently, four wheel, high drive is established in the transfer case or gear mechanism 15. It will be appreciated that shift rail 69 is restrained from moving relatively to the front or to the left, as viewed in FIGURE 3, with respect to the shift rail 37 and the transfer casing 14 by the blocking action afforded by the interlock pin 123.

To shift the rails 37 and 69 from the four wheel high position to their two wheel high position which is illustrated in FIG. 4, the shift lever handle 142 is moved forwardly from the four wheel high position to the two wheel high position or to the left, as viewed in FIGURE 9. As such movement of the lever handle 142 occurs, an oppositely or rearwardly directed force is imposed upon the primary link 93 through head 140. During such shifting period, because the actuating force is applied substantially medially of the link 93, and since the rail 37 is held substantially stationary by the interlock pin 124 the link 93 will pivot about pin 109 from its position of FIG. 3 to the position illustrated in FIGURE 4. The shifting force, therefore, causes the link 93 to rotate clockwise about the pin 109 to shift the rail 69 rearwardly from the position of FIG. 3 to the position of FIG. 4, the rail 37 being held as aforesaid by the blocking action of the interlock pin 124 with the rail 37, the gears 19 and 34 being retained enmeshed. Shifting of the rail 69 from the position illustrated in FIG. 3 to the position illustrated in FIG. 4 is permitted because the interlock pins 123 and 124 are effective to block such rearward movement of the rail 69 and during such shifting of rail 69 the gear 66 and the gear 70 will be disengaged or unmeshed and the gear 66 will be moved to its neutral position which is illustrated in FIG. 2. Thus, shifting from four wheel high position to two wheel high position and disconnecting the front wheel output shaft 51 from the drive train is accomplished. It will be noted that the rear portion of recess 121 in the rail 69 is brought into transverse alignment with recess 122 and the pins 124. Thus, interlock pin 124 is incapable of restraining relative movement of the rails 69 and 37 with respect to each other or the transfer casing 14 when the rails are in this relative position. However, when the rails 37, 69 and pins 123, 124 are in such position, rail 69 is restrained from rearward movement by virtue of the fact that since the rail 37 remained stationary during the above described shifting period, the end 130 of the pin 123 remained in engagement with the inner surface 132 thereof while the opposite end slid on the bottom of recess 121 of rail 69 until the forward end of the recess 121 defined by surface 127 was engaged thereby to block further rearward movement with respect to rail 37.

To obtain the neutral rail position of FIG. 5, the shift lever handle 142 is moved forwardly from the vehicle operator longitudinally from the two wheel high position heretofore described. As a consequence, a diagonally opposite rearward force is caused to be applied on link 93 by the working head 140. As such rearward force is applied, the rail 69 is held from moving farther backwardly by reason of the engagement of end 126 of interlock pin 123 with the forward end wall 127 of the recess 121 in the rail 69, and frictional engagement of end 130 of interlock pin 123 with inner surface 132 of rail 37, as described above. Thus, since the rail 37 is free to move rearwardly only the rail 37 will move rearwardly to the position of FIG. 5 upon shifting of the shift lever 77 from two wheel high position to neutral. Movement of the rail 37 is effected by pivoting of the primary link 93 about the pin 104 in a counterclockwise direction as viewed in FIGURE 4. In such shifting, the yoke 36 will shift the gear 34 to the right with respect to FIG. 2 out of mesh with gear 19 into neutral position heretofore described. In shifting from the two wheel high position to the neutral position, the primary link 93 is pivoted counterclockwise from a position in which a portion of the secondary link 99 extends beneath the aperture 94 as in FIG. 4, to a position at which the recess 101 is vertically aligned or in registration with primary link aperture 94, as in FIG. 5, thereby to accommodate lateral movement of the work head 140 from the position illustrated in FIG. 5 to the position illustrated in FIG. 6 or lateral shifting of the shift handle 142 from the "N" neutral position to the "N'" neutral position illustrated in FIG. 9. Obviously, such lateral shifting of the shift handle 142 does not effect the longitudinal positioning of the rails 37 and 69.

The shifting of head 140 to the position of FIG. 6 locks the primary link 93 and the secondary link 99 together whereby they are incapable of pivoting about pin 104 with respect to each other because the head 140 is disposed in both the recess 101 and the aperture 94, and thus, precludes independent movement of rails from a force applied at the links. By then moving the handle 142 forwardly from the position N' to position 4WL in FIG. 9 and thereby causing the work head 140 to exert rearwardly by directed force on the locked links 93 and 99, the rails 37 and 69 have a rearward force exerted thereon tending to move them rearwardly simultaneously. Such rearward force tends to shift the gear 34 and the gear 66 simultaneously toward the gear 39.

However, in the event both of the shiftable gears 34 and 66 are unable simultaneously to mesh with gear 40, the gear 66 is employed as a lead gear, and its partial movement into mesh is accommodated as the rail 69 moves rearwardly from its position corresponding to the N' position of the handle 142 to the position illustrated in FIG. 6. In the event, that the teeth 41 of the gear 34 are not in alignment with the spaces between the teeth 39 of the gear 40 the gear 34 will merely abut the gear 40. No damage to the leakage system results because the gears 40 and 34 are not meshable since movement of the shift control lever 77 relative to the rail 37 is accommodated by the spring 119 which will be compressed by the rearward movement of the link 93 as the rail 69 moves rearwardly and as link 93 slides rearwardly over rail end 110. In such butted position, rail 37 is locked from forward movement by engagement of pin end 130 with rear end wall 135 of recess 121 in rail 37. Once the teeth 41 of the gear 34 and the teeth 39 and the gear 40 are in proper alignment for meshing engagement, the spring 119 urges the shift rail 37 rearwardly from the position shown in FIGURE 7 to the position illustrated in FIGURE 8 wherein the gears 34 and 40 are in meshing engagement.

By the time the gear 66 has moved into full mesh or engagement with the gear 40, gear 34 will have registered and gone into partial mesh with said gear 40. That position is illustrated in FIG. 7 of the drawings in which it is seen that the rail 69 is precluded from further rearward movement by reason of engagement of front wall 127 of recess 121 in rail 69 with interlock pin end 129.

In FIG. 8, the full four wheel low position of the shift rails 37 and 69 is shown. From the position of FIG. 7, the shift rail 37 has been moved rearwardly by expansion of the spring 119, with the rearward movement of said shift rail 37 being halted by engagement of the pin 109 with the rear end 128 of the recess 108, and also by engagement of the end portion or projection 130 of interlock pin 123 with the forward wall 131 defining the recess 121 in the shift rail 37.

From the foregoing it is appreciated that although the two wheel low position is defined by the gear mechanism, its attainment is effectively precluded. In other words, the transmission control means is so designed that gear 34 can never be brought into meshing engagement with gear 40 without gear 66 also being in meshing engagement with gear 40.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. In a power transmission mechanism, a pair of shiftable rails, said rails each being shiftable in opposite directions from a "neutral" position; and interlock means operatively engaging said rails and being operable to permit said rails to be shiftable independently of each other from their "neutral" position when force is applied thereto in one direction, said interlock means permitting one of said rails to be shiftable only after the other rail has been shifted to a predetermined position, said interlock means being operable to permit shifting of said rails in unison from their "neutral" position when force is applied thereto in the opposite direction.

2. In a power transmission mechanism, a pair of shiftable gear actuating rails, said rails each being shiftable in opposite directions to first and second positions from a "neutral" position; and interlock means operatively engaging said rails and being operable to permit said rails to be shiftable only independently and sequentially of each other between their "neutral" and first positions, said interlock means being automatically operable to permit shifting of said rails in unison between their "neutral" and second positions.

3. In a power transmission mechanism, a pair of substantially parallel, shiftable gear actuating rails, each of said rails being shiftable along its longitudinal axis in opposite directions to first and second positions from an intermediate "neutral" position; interlock means disposed between and operatively engaging said rails, said interlock means being operable to permit said rails to be shiftable only independently and sequentially of each other between their "neutral" and first positions, said interlock means being automatically operable to permit shifting of said rails in unison between their "neutral" and second positions; and a single control lever operatively connected to said rails, said lever being movable to impart forces to said rails tending to shift them between their "neutral," first and second positions.

4. In a power transmission mechanism, a pair of substantially parallel shiftable gear actuating rails, each of said rails being shiftable along its longitudinal axis in opposite directions to first and second positions from an intermediate "neutral" position; interlock means disposed between and operatively engaging said rails, said interlock means being operable to permit said rails to be shiftable only independently and sequentially of each other between their "neutral" and first positions, said interlock means being automatically operable to permit shifting of said rails in unison between their "neutral" and second positions, a single control lever pivotally supported for pivotal movement in either one of two planes; and linkage means operatively connected to said control lever and said rails whereby pivotal movement of said control lever in one of said planes imparts forces to said rails tending to shift them between their "neutral" and first positions and pivotal movement of said control lever in the other of said planes imparts forces to said rail tending to shift them between their "neutral" and second positions.

5. In a power transmission mechanism for a motor vehicle having front wheel means and rear wheels means operatively connected to the power transmission mechanism, a pair of substantially parallel, reciprocal gear actuating rails, each of said rails being shiftable for controlling the drive condition of a respective one of said wheel means, each of said rails being shiftable along its longitudinal axis in opposite directions to "low" and "high" positions corresponding to "low" and "high" speed drive conditions, respectively, of a respective wheel means from an intermediate "neutral" position; interlock means disposed between and operatively engaging said rails, said interlock means being operable to permit said rails to be shiftable only independently and sequentially of each other between their "neutral" and "high" positions, said interlock means being automatically operable to permit shifting of said rails in unison between their "neutral" and "low" positions; and a single control lever operatively connected to said rails, said lever being movable to impart forces to said rails tending to shift them between their "neutral," "high" and "low" positions.

6. In a power transmission for a motor vehicle having front wheel means and rear wheel means operatively connected to the power transmission, a pair of substantially parallel, reciprocal gear actuating rails, each of said rails being shiftable for controlling the drive condition of a respective one of said wheel means, each of said rails being shiftable along its longitudinal axis in opposite directions to "low" and "high" conditions corresponding to "low" and "high" speed drive positions, respectively, of a respective wheel means from an intermediate "neutral" position; slidably mounted interlock pin means disposed between and operatively engaging said rails, said interlock pin means being operable to permit said rails to be shiftable only independently and sequentially of each other between their "neutral" and "high" positions, said interlock pin means being automatically operable to permit shifting of said rails in unison between their "neutral" and "low" positions; and a single control lever pivotally supported for pivotal movement in either one of two planes, said control lever being operably connected to said rails, said control lever imparting forces to said rails tending to shift them between their "neutral" and "high" positions upon pivotal movement thereof in one of said planes and imparting forces to said rails tending to shift them between their "neutral" and "low" positions upon pivotal movement thereof in the other one of said planes.

7. In a power transmission for a motor vehicle having front wheel means and rear wheel means operatively connected to the power transmission, a transmission casing; a pair of substantially parallel gear actuating rails supported by said casing for sliding movement along their longitudinal axes, each of said rails being shiftable for controlling the drive condition of a respective one of said wheel means, each of said rails being shiftable along its longitudinal axis in opposite directions to "low" and "high" positions corresponding to "low" and "high" speed drive conditions, respectively, of a respective wheel means from an intermediate "neutral" position; interlock pin means supported by said casing for sliding movement normal to the longitudinal axes of said rails, said interlock pin means being disposed between and operatively engaging said rails, said interlock pin means being operable to permit said rails to be shiftable only independently and sequentially of each other between their "neutral" and "high" positions, operable to permit shifting of said rails in unison between their "neutral" and "low" positions; a single control lever pivotally supported by said casing for pivotal movement in either plane of two angularly oriented, generally longitudinally extending planes; linkage means including a link extending between said rails, said link being operatively connected to said control lever; means pivotally connecting said link to one of said rails; and means operatively connecting said link to the other one of said rails, said control lever imparting forces to said rails through said linkage means tending to shift them between their "neutral" and "high" positions which pivoted in one of said planes of pivotal movement and imparting forces to said rails through said linkage means tending to shift them between their "neutral" and "low" positions when pivoted in the other of said planes.

8. In a power transmission for a motor vehicle as set forth in claim 7, wherein said means operatively connecting said link to said other end of said rails is constructed and arranged to permit relative pivotal movement between said link and said other one of said rails in both directions about an axis perpendicular to the longitudinal axis of said other one of said rails and relative axial movement in only one direction, and biasing means yieldably resisting relative axial movement between said link and said other one of said rails.

9. In a power transmission for a motor vehicle as set forth in claim 7, wherein said link is provided with a transversely extending, elongated opening therethrough and the normally lowermost portion of said control lever is disposed within said opening.

10. In a power transmission for a motor vehicle as set forth in claim 7, wherein said means operatively connecting said link to said other one of said links includes a one-way overload release connection whereby said link is permitted to move relatively to said other one of said rails during pivotal movement of said control lever in a direction to impart forces on said rails through said linkage means in a direction to shift them from their "neutral" positions to their "low" positions in the event said other one of said rails is incapable of shifting from its "neutral" position to its "low" position during such pivotal movement of said control lever.

11. In a power transmission for a motor vehicle having front wheel means and rear wheel means operatively connected to the power transmission, a transmission casing; a pair of substantially parallel gear actuating rails supported by said casing for sliding movement along their longtiudinal axes, each of said rails being shiftable for controlling the drive condition of a respective one of said wheel means, each of said rails being shiftable along its longitudinal axis in opposite directions to "low" and "high" positions corresponding to "low" and "high" speed drive conditions, respectively, of a respective wheel means from an intermediate "neutral" position; interlock pin means including a pair of longitudinally spaced pins supported by said casing for sliding movement along parallel axes normal to the longitudinal axes of said rails, said interlock pins being disposed between and operatively engaging said rails, said interlock pins being operable to permit said rails to be shiftable only independently and sequentially of each other between their "neutral" and "high" positions, said interlock pins being automatically operable to permit shifting of said rails in unison between their "neutral" and "low" positions; a single control lever pivotally connected intermediate its ends to said casing, said control lever being capable of pivotal movement in either plane of two angularly oriented, generally longitudinally extending planes; a link extending transversely between said rails having one end pivotally connected to one of said rails, said link having a transversely elongated opening therethrough in which the lowermost end of said control lever is disposed; and means operatively connecting the opposite end of said link to the other of said rails including a resilient connection yieldable in one direction whereby said link is permitted to move relative to said other one of said rails against the resilient action afforded by said resilient connection during pivotal movement of said control lever in a direction to impart forces on said rails through said link to shift them from their "neutral" positions to their "low" positions in the event said other one of said rails is incapable of shifting from its "neutral" position to its "low" position during such pivotal movement of said control lever.

12. In a power transmission for a motor vehicle having front wheel means and rear wheel means operatively connected to the power transmission, a transmission casing; a pair of substantially parallel gear actuating rails supported by said casing for sliding movement along their longitudinal axes, each of said rails being shiftable along its longitudinal axis for controlling the drive conditions of a respective one of said wheel means, each of said rails being shiftable along its longitudinal axis in opposite directions to "low" and "high" positions corresponding to "low" and "high" speed drive conditions, respectively, of a respective wheel means from an intermediate "neutral" position; interlock means including a pair of longitudinally spaced pins supported by said casing for sliding movement along parallel axes normal to the longitudinal axes of said rails, said interlock pins being disposed between and operatively engaging said rails, said interlock pins being operable to permit said rails to be shiftable only independently and sequentially of each other between their "neutral" and "high" positions, said interlock pins being automatically operable to permit shifting of said rails in unison between their "neutral" and "low" positions; a single control lever having a portion intermediate its ends connected to said casing for universal pivotal movement, said control level being capable of pivotal movement in either plane of two angularly oriented, generally longitudinally extending planes to effecting shifting of said rails to their "high," "low" and "neutral" positions, said control lever further being capable of pivotal movement in a generally vertical, transversely extending plane so as to move the lowermost end of said lever transversely; a primary link extending transversely between said rails having a transversely elongated opening therethrough through which the lowermost end of said control lever projects, said lowermost end being movable between the transverse ends of said opening during pivotal movement of said control lever in said generally vertical, transversely extending plane; a secondary link rigidly secured to one of said rails; means pivotally connecting one end of said primary link to said secondary link whereby said secondary link is disposed beneath said primary link; means operatively connecting the opposite end of said primary link to the other of said rails; and releasable lock means for preventing relative pivotal movement between said primary and secondary links during pivotal movement of said control lever in a direction to effect shifting of said rails between their "neutral" and "low" positions including a notch formed in one edge of said secondary link, said notch being in registration with one transverse end of said opening when said rails are in their "neutral" position, said lowermost end of said control lever being movable into said notch upon pivoting of said control lever in said generally vertical, transversely extending plane in a particular direction.

13. In a power transmission for a motor vehicle as set forth in claim 12, wherein said means operatively connecting the opposite end of said primary link to the other of said rails includes a resilient connection yieldable in one direction whereby said primary link is permitted to move relatively to said other one of said rails against the resilient action afforded by said resilient connection during pivotal movement of said control lever to impart forces on said rails through said primary link to shift them from their "neutral" positions to their "low" positions in the event said other one of said rails is incapable of shifting from its "neutral" position to its "low" position during such pivotal movement of said control lever.

References Cited
UNITED STATES PATENTS 3,283,298   11/1966   Kaiser _____ 74—477

MILTON KAUFMAN, *Primary Examiner.*